United States Patent [19]
Greiff

[11] Patent Number: 5,195,371
[45] Date of Patent: Mar. 23, 1993

[54] SEMICONDUCTOR CHIP TRANSDUCER

[75] Inventor: Paul Greiff, Wayland, Mass.

[73] Assignee: The Charles Stark Draper Laboratory, Inc., Cambridge, Mass.

[21] Appl. No.: 479,854

[22] Filed: Feb. 14, 1990

Related U.S. Application Data

[63] Continuation-in-part of Ser. No. 143,515, Jan. 13, 1988, abandoned.

[51] Int. Cl.$^5$ .............................. G01P 9/04; G01P 15/13
[52] U.S. Cl. ..................................... 73/505; 73/517 B
[58] Field of Search ............ 73/505, 517 R, 517 AV, 73/514, 517 B, DIG. 1; 331/280, 283; 357/26

[56] References Cited

U.S. PATENT DOCUMENTS

| | | | |
|---|---|---|---|
| 4,342,227 | 8/1982 | Petersen et al. | 73/517 R |
| 4,598,585 | 7/1986 | Boxenhorn | 73/505 |
| 4,600,934 | 7/1986 | Aine et al. | 73/517 R |
| 4,670,092 | 6/1987 | Motamedi | 73/517 R |
| 4,679,434 | 7/1987 | Stewart | 73/517 B |
| 5,025,346 | 6/1991 | Tang et al. | 361/283 |

FOREIGN PATENT DOCUMENTS 2183040  5/1987  United Kingdom ............. 73/517 R

OTHER PUBLICATIONS

Teknekron Sensor Development Corporation, article entitled "Micro-Vibratory Rate Sensor", 1080 Marsh Road, Menlo Park, CA 94025, 2 pages, undated.

Primary Examiner—John E. Chapman
Attorney, Agent, or Firm—Weingarten, Schurgin, Gagnebin & Hayes

[57] ABSTRACT

A motion transducer fabricated from a semiconductor material by etched exposure and release of a resiliently suspended element. Electrical sensing and/or torquing is applied to the suspended element to produce mass or vibrational sensitivities to provide a transducer for various physical parameters. In the case of a gyroscopic transducer a mass is applied to the element and may be applied in a balanced configuration on either side. The semiconductor element and electrodes may be isolated by the use of buried PN junctions or dielectric layers, and a separately formed insulating dielectric bridge may be used to provide a support link between the suspended element and the remainder of the semiconductor material. A specific crystal orientation is useful in permitting etch control in freeing the suspended element from the remainder of the material. Suspension link stress relief is provided and a waffle construction achieved in the suspended element for use in motional transduction.

6 Claims, 12 Drawing Sheets

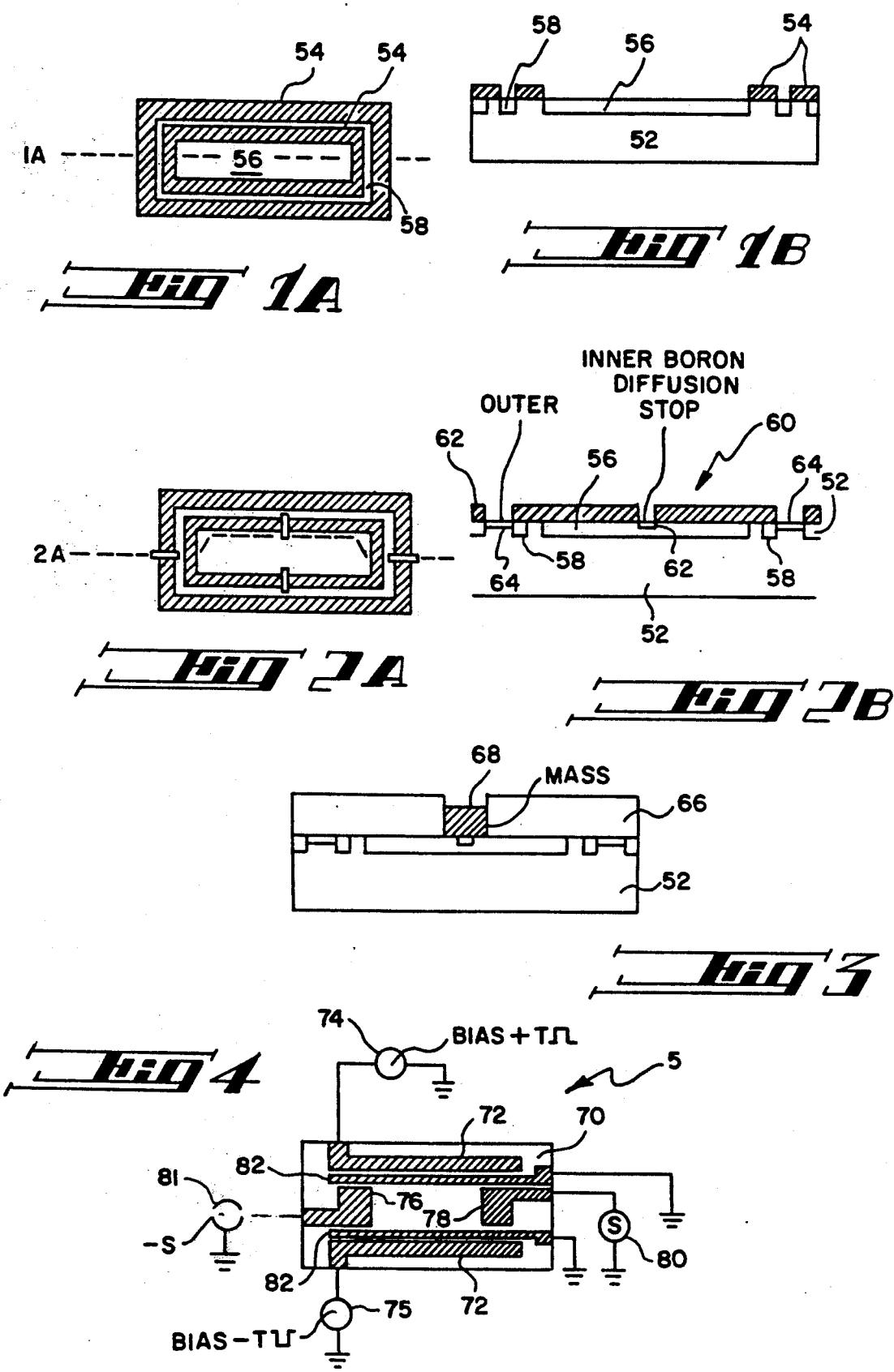

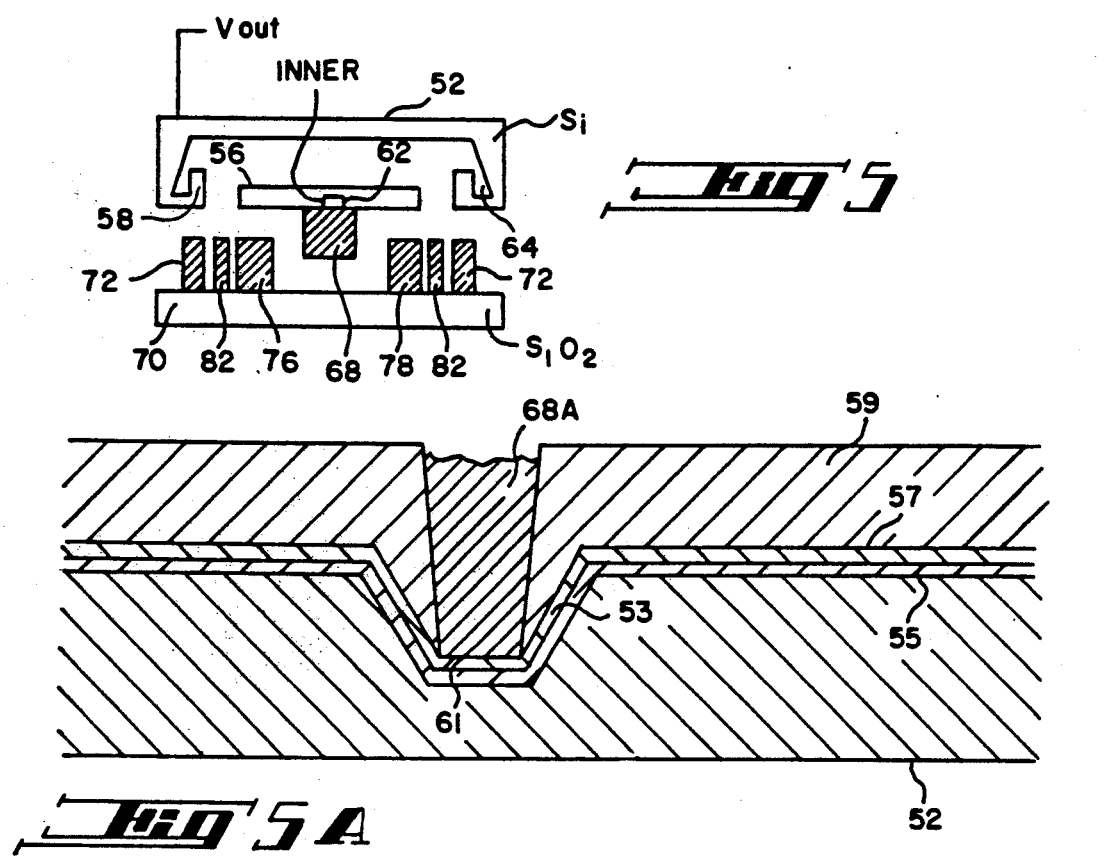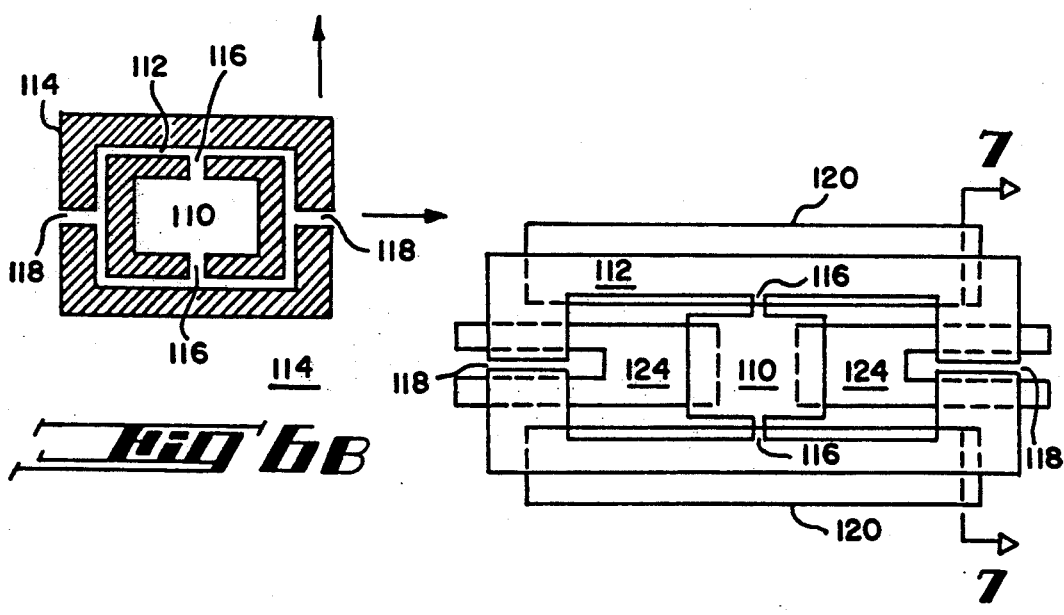

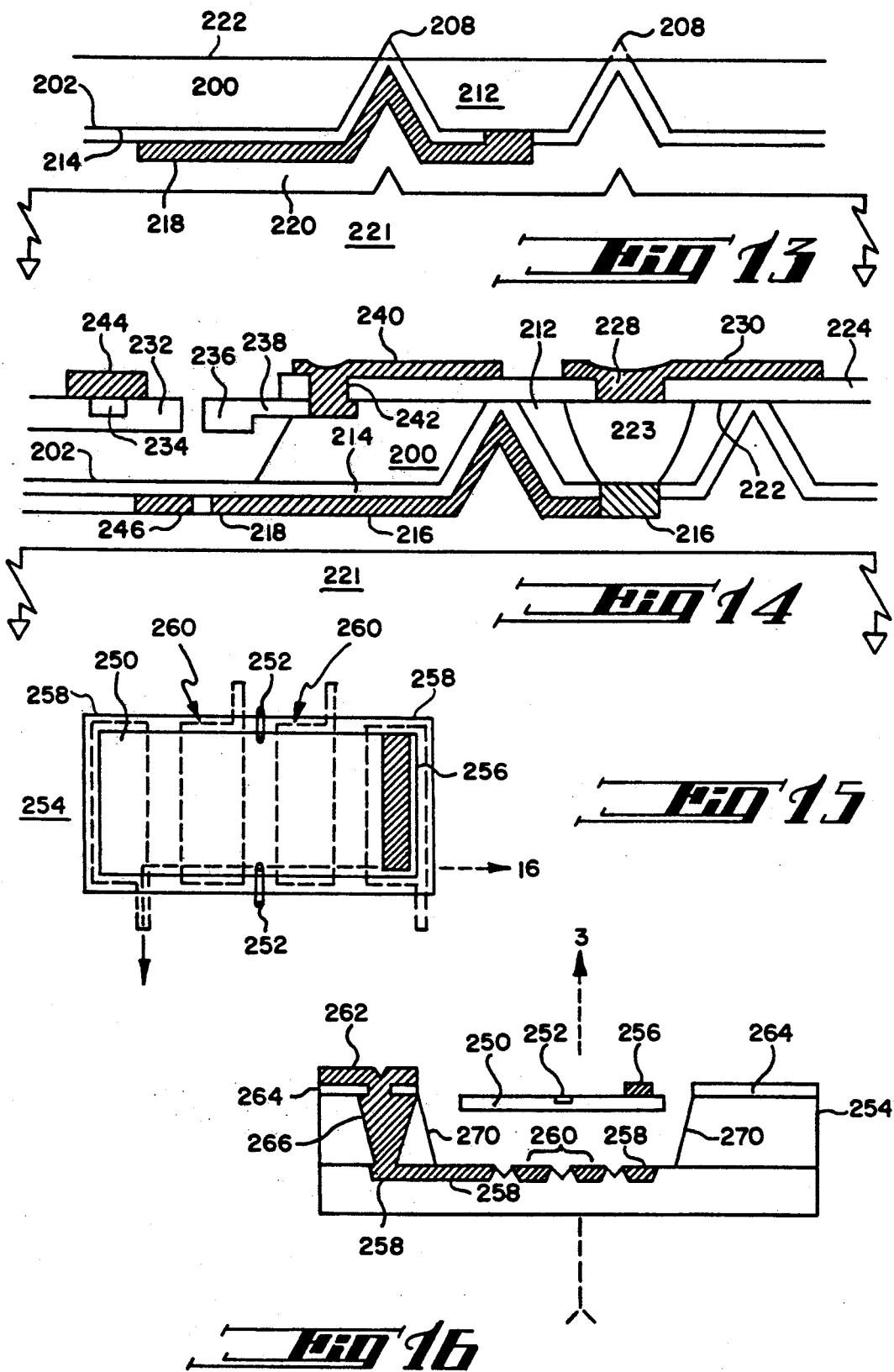

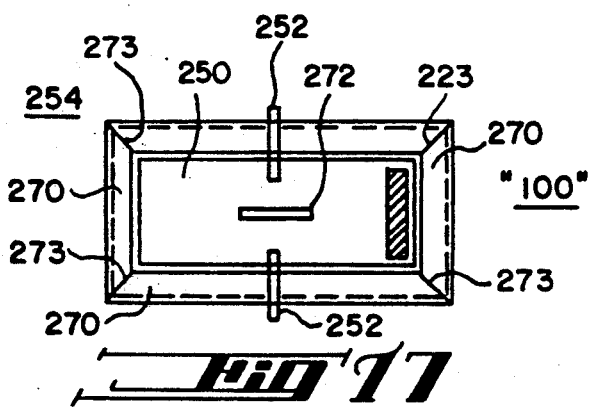
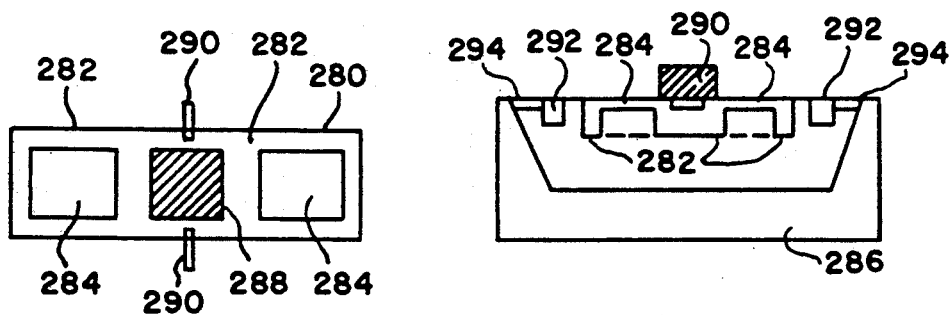
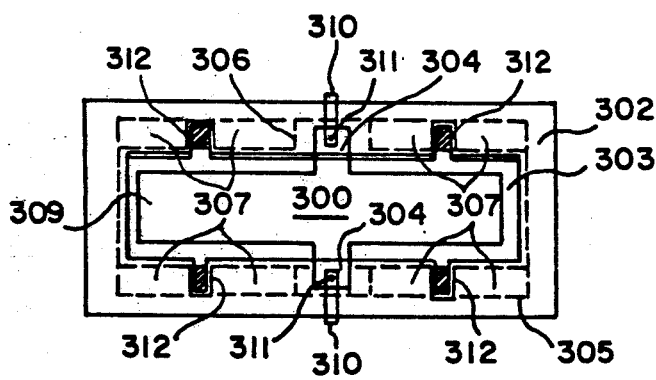
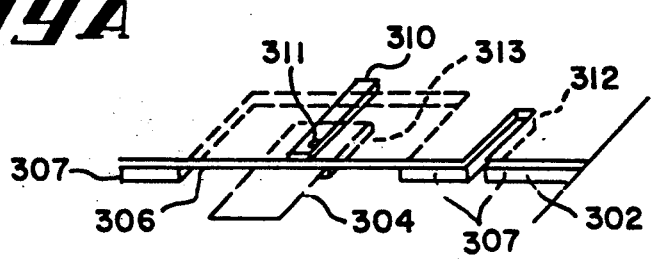

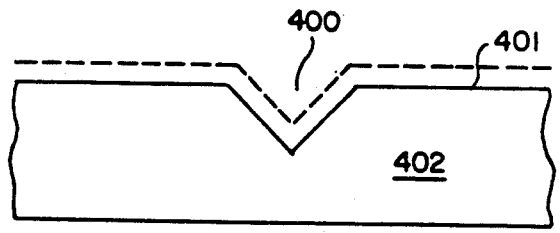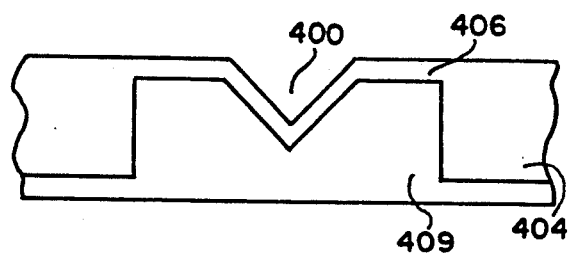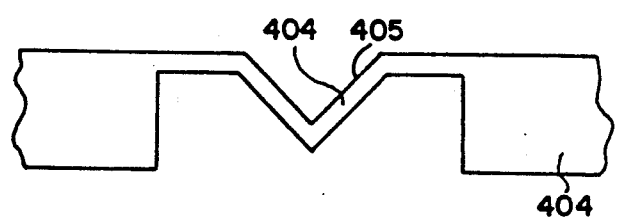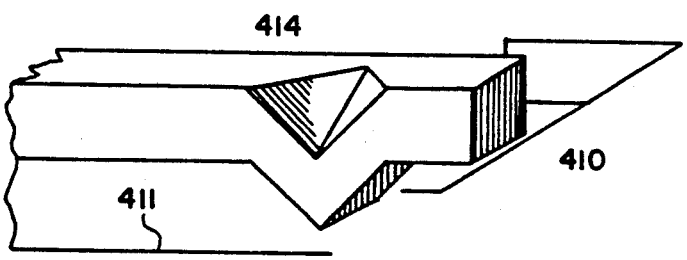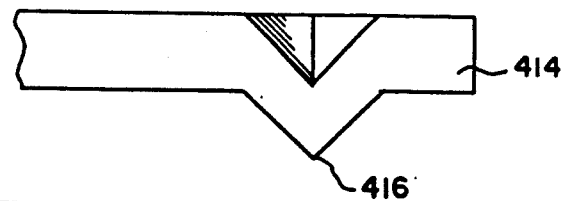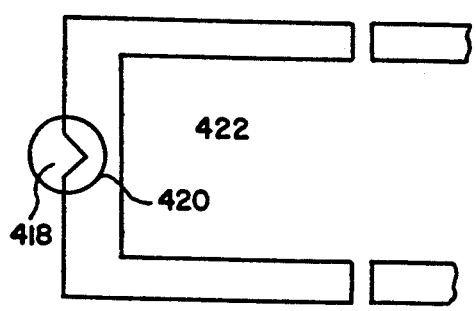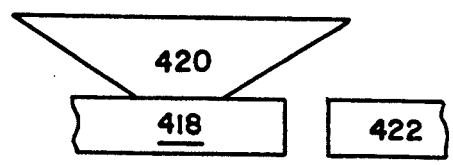

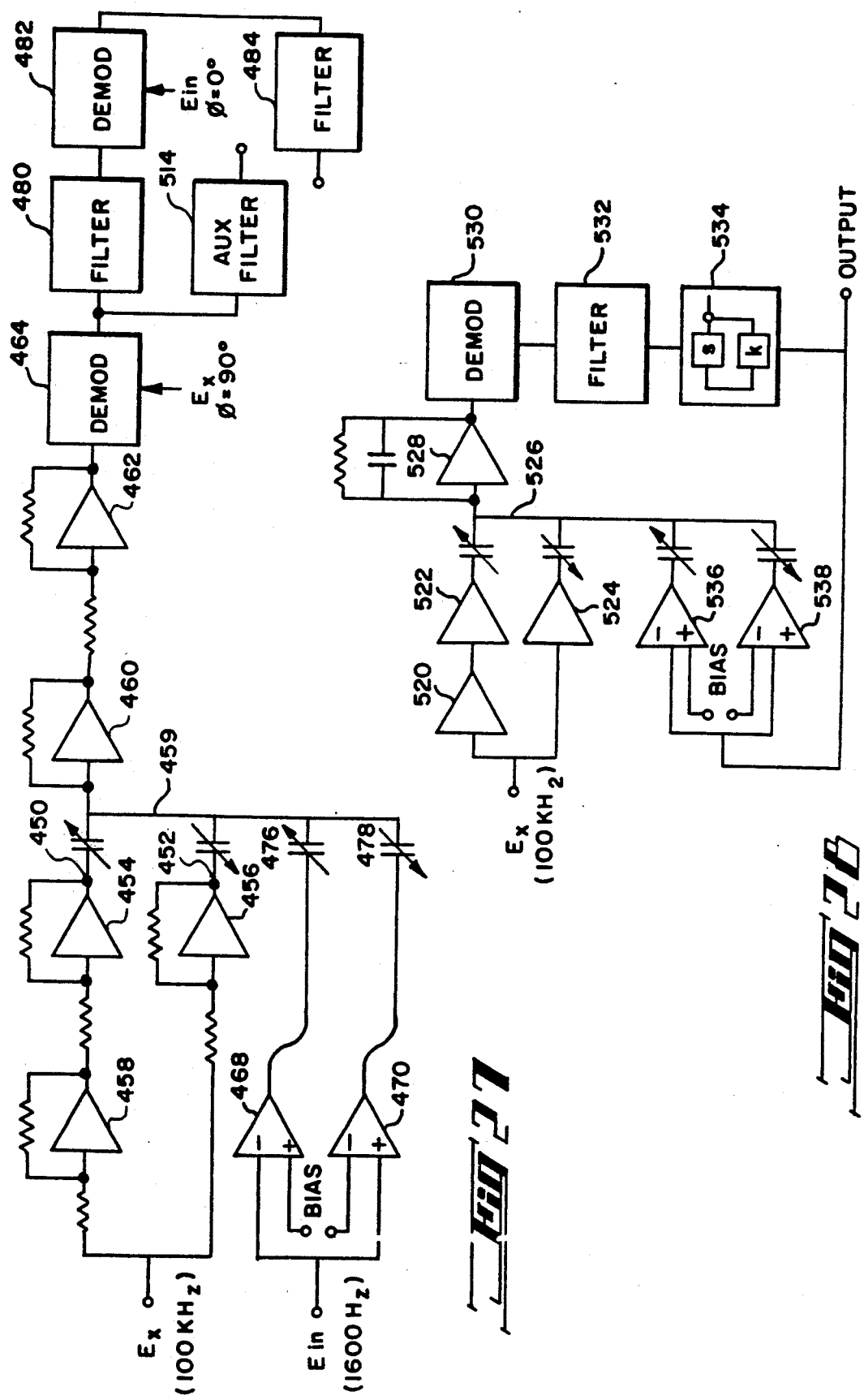

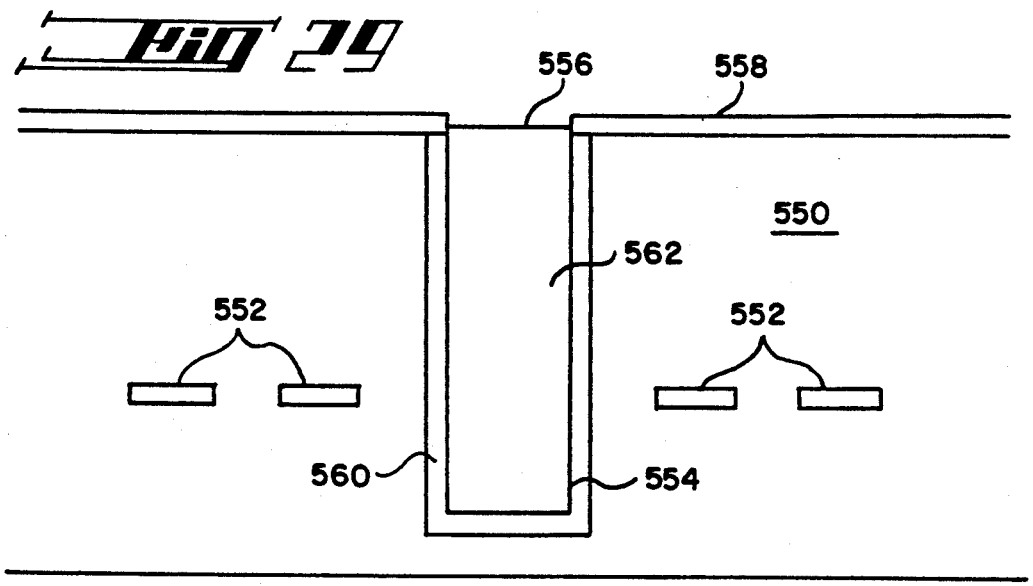
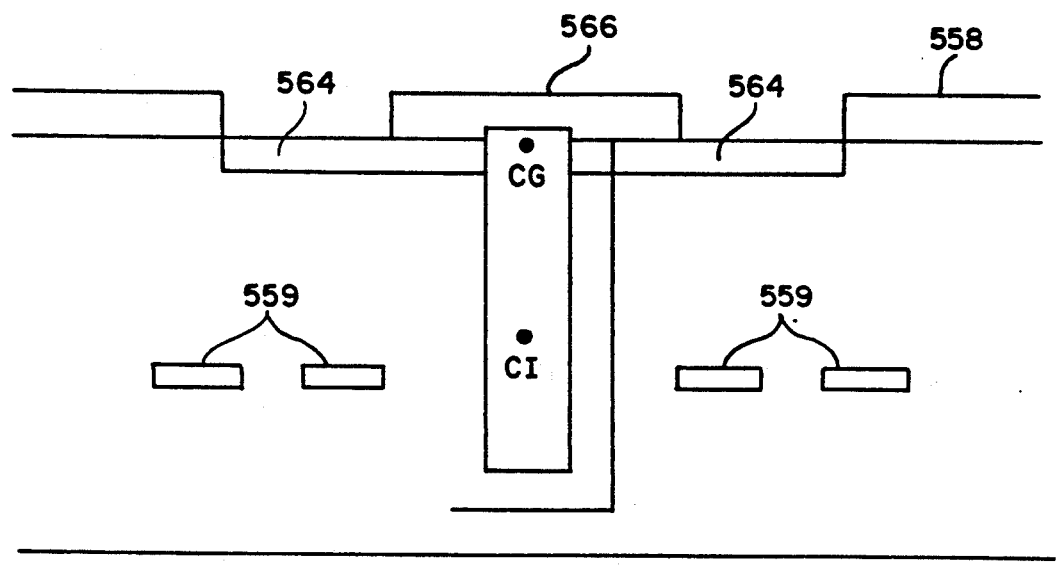
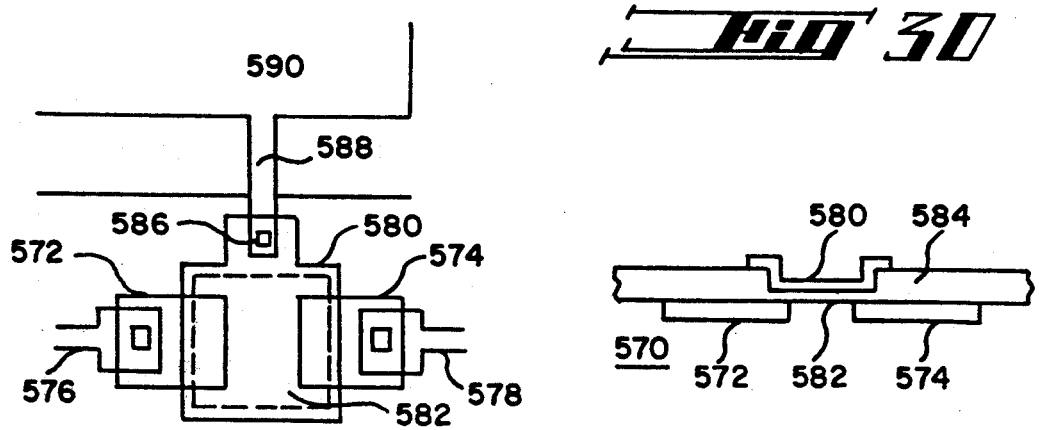

SEMICONDUCTOR CHIP TRANSDUCER

CROSS-REFERENCE

This application is a continuation-in-part of U.S. application Ser. No. 07/143,515, filed Jan. 13, 1988, now abandoned.

FIELD AND BACKGROUND OF THE INVENTION

The present invention relates to motional transduction devices in a substantially miniature form and formed by isolating a resiliently supported semiconductor substrate from a semiconductor.

The capability of semiconductor materials such as a solid block of mono- or polycrystalline silicon to be etched and otherwise formed has been utilized to permit the etched isolation of a suspended substrate element for use in gyroscopic transduction as shown in the U.S. Pat. No. 4,598,585.

The present invention concerns itself with the advancement of such technologies and applications.

SUMMARY OF THE INVENTION

In accordance with the teaching of the present invention a semiconductor chip transducer is disclosed in which a semiconductor element is supported in a frame of semiconductor material by a flexible linkage (flexure) which permits the element to move relative to the frame. The support element and frame are typically formed from the same mono- or polycrystalline semiconductor mass and the supported element is etched out of the mass to form both the element and frame. Where selective etching is utilized monocrystalline silicon is provided. The linkage flexure may be formed from the same semiconductor mass and left by selective etching or independently created as a dielectric grown layer.

The transducer can fulfill various functions including accelerometer transduction, gyroscopic transduction, and vibrational pressure sensitivity, among others. For one or more such applications, electrodes are formed in the semiconductor frame in portions facing the flexure supported element to provide torque and/or position sensing. Such electrodes may be isolated by PN junctions or by an appropriately grown and etched dielectric layer to provide complete isolation.

For motional transduction a weight mass is typically applied to the semiconductor flexure supported element and the mass may be applied both above and below the supported element for mass balance purposes.

Monocrystalline semiconductor materials can be advantageously oriented with the <111> planes to provide for control over the etching process. Additional apertures may be provided through the supported element in order to facilitate complete under-etching. The supported element may also be additional apertured in portions adjacent to the flexible linkage between substrate and frame to provide stress relief.

Electrical excitation of the transducer is provided by circuitry adapted for gyroscopic or accelerometer applications.

DESCRIPTION OF THE DRAWINGS

These and other features of the present invention are more fully described in the solely exemplary detailed description to follow and in the accompanying drawing of which:

FIGS. 1A and 1B are first top and sectional views in the fabrication of a semiconductor chip transducer from a block of semiconductor material;

FIGS. 2A and 2B are further top and sectional views in the processing of the semiconductor chip transducer;

FIG. 3 is a yet further view in cross-section in the production of a semiconductor chip transducer;

FIG. 4 is a yet further top view, illustrating electrode placement, of a semiconductor ship transducer in the process of formation from a single semiconductor mass;

FIG. 5 is a sectional view of a completed semiconductor device according to the first embodiment;

FIG. 5A illustrates the formation of a balanced mass;

FIG. 8 is a top view of a completed semiconductor device according to the second embodiment;

FIG. 8A is an expanded view of a portion of FIG. 8;

FIG. 13 is a yet further sectional view in the process of manufacture according to the third embodiment;

FIG. 14 is a sectional view of a completed device according to the third embodiment;

FIG. 15 is a top view of a further embodiment of a semiconductor chip transducer providing the function of a rebalance accelerometer;

FIG. 16 is a sectional view of the device of FIG. 15;

FIG. 17 is a top view of a semiconductor substrate flexibly supported within a frame and having additional substrate apertures to promote etching controlled by the <111> crystalline plane of a monocrystalline semiconductor mass;

FIGS. 18A and 18B are top and sectional views of a gyroscopic transduction device according to the invention having minimal substrate mass;

FIGS. 19A and 19B are top and perspective views of a semiconductor device having dielectric support links between frame and semiconductor resiliently supported substrate;

FIGS. 21-23 are sectional views of an alternative form of stress relief in the process of formation;

FIGS. 24-25 are sectional views of motion limit and their fabrication;

FIGS. 26A and 26B are top and sectional views of a travel limit;

FIG. 27 illustrates circuitry for gyroscopic sense and torque signal processing;

FIG. 28 illustrates circuitry for accelerometer sense and torque signal processing;

FIG. 29 is a sectional view of first steps in the processing of a high inertial mass transducer;

FIG. 30 is a sectional view completing the processing of FIG. 29;

FIG. 31 is a top view of an FET integrated into the flexure termination; and

FIG. 32 is a sectional view of the integrated FET.

DETAILED DESCRIPTION

The present invention contemplates a motion transducer fabricated from a semiconductor material by etched exposure of an element or substrate resiliently suspended within a frame of the same semiconductor material. To accomplish the transduction function which may include acceleration, gyroscopic or pressure transduction among others, electrodes for sensing or inducing motion may be applied to the frame or a further substrate. Electrode isolation may be accomplished using PN junction isolation, or oxide layer isolation. Additionally, the suspension between the element and the frame may be accomplished by either integral semiconductor flexures or separately applied isolating dielectric flexures. For acceleration or gyroscopic transduction a mass, which is preferably provided on both sides of the resiliently suspended element, is applied centrally about an axis of rotation or offset depending upon the function. In order to facilitate control of the etching to free the element from the frame the semiconductor wafer is preferably oriented so that etching is through the <100> crystal surface plane and bounded by the <111> planes that extend into the silicon from the edges of the etch apertures. Additional slits for stress relief or to facilitate etching under the element are provided.

Figure 1:
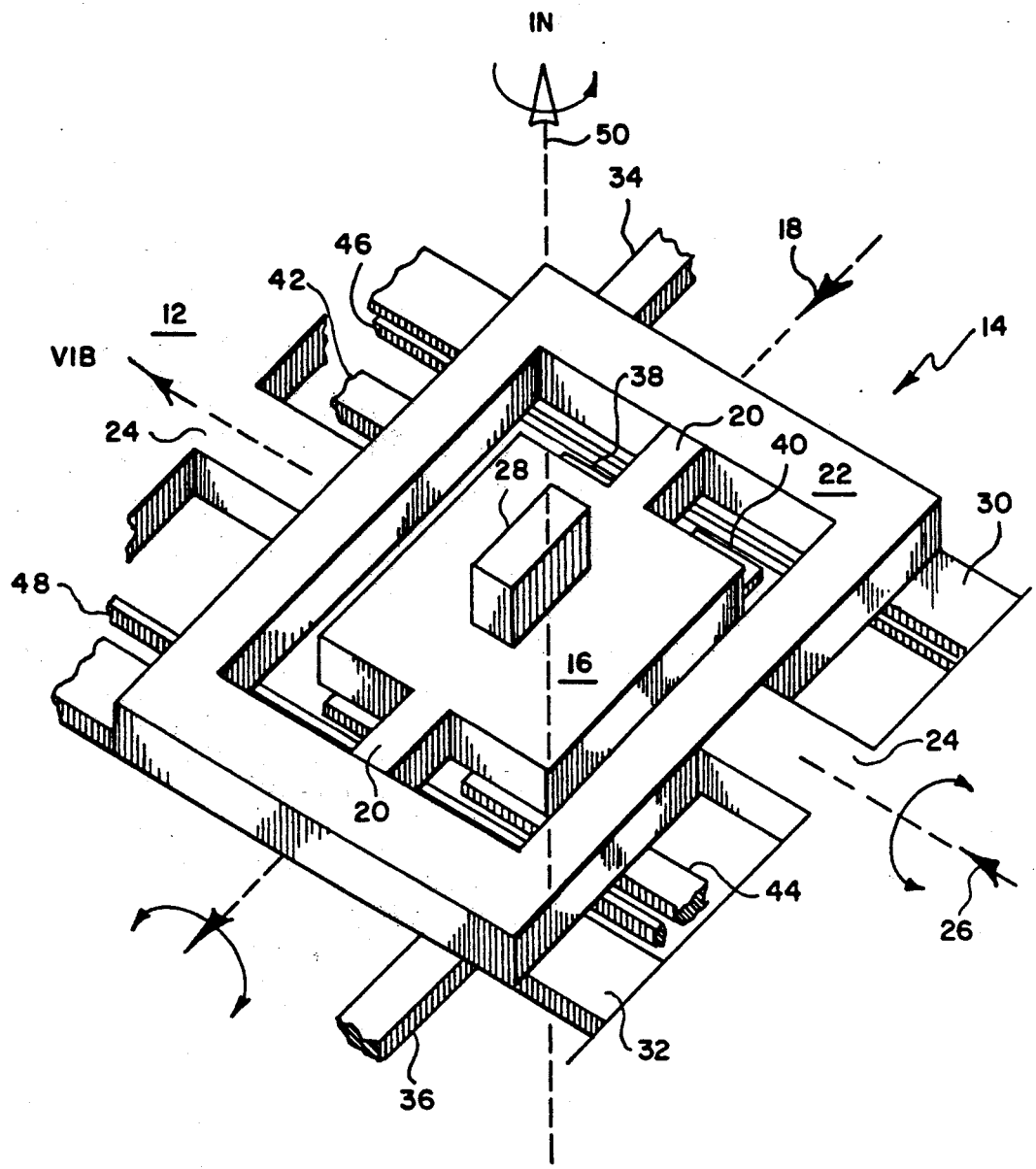
FIG. 1 is a perspective view of a conceptualized semiconductor chip transducer having a substrate flexibly joined to a frame and formed by etching from a single semiconductor mass.

A view of a motion transducer, particularly a gyroscopic transducer according to the invention, is illustrated in general pictorial form in FIG. 1. With respect to FIG. 1 there is illustrated, within a semiconductor frame 12, a resiliently supported gimbal system 14 comprising an inner planar element 16 supported for rotation about an axis 18 through resilient supports 20 connecting the planar element 16 to an outer element 22 which is in turn supported from the frame 12 by resilient supports or flexures 24 about an axis 26. A mass 28 is supported on the element 16 at the location of the axis 18.

The elements 16, 20, 22, 24 and 12 are typically fabricated from a single mass of semiconductor material of mono or polycrystalline form which has been etched to leave the elements described above by processes to be described below.

A pair of electrodes 30 and 32 are placed below the portions of the outer element 22 most remote from the axis 26 and are excited to provide vibration about the axis 26 of the outer element 22 and correspondingly of the inner element 16. Energization for the electrodes 30 and 32 is applied through outwardly extending conductor paths 34 and 36. An inner set of electrodes 38 and 40 are placed below the element 16, parallel to the axis 18 and remote from it. They are connected through conductor paths 42 and 44 to external sensing electronics as is known in the art in order to detect vibrational motion of the element 16. A pair of guard electrodes 46 and 48 serve to electrically isolate the fields from the electrodes 30 and 32 on the one hand and the electrodes 38 and 40 on the other hand.

In operation, the electrodes 30 and 32 are energized to induce vibration of the outer element 22 and element 16 about the axis 26. Any rotation of the entire structure about an axis 50 extending vertically and perpendicularly through the elements 16 and 22 induces an output vibration of the element 16 about the output axis 18 which is in turn sensed by the electrodes 38 and 40 by electronics as described below.

The electrodes 30, 32, 38 and 40 along with the shields 46 and 48 may be advantageously applied to a separate substrate such as a glass or other dielectric substrate placed in close proximity to the elements 16 and 22 or may be themselves embedded in a portion of the semiconductor material 12. The various embodiments by which the structure of FIG. 1 may be realized are shown more fully below in the following description.

A first form for the generation of the structure of FIG. 1 is illustrated in FIGS. 1A through 5. In FIGS. 1A and 1B there is illustrated the initial steps in the manufacture of such a structure. As shown there a block of P type semiconductor material 52 is thermally oxidized to produce an oxide layer 54 on the surface. The wafer is then processed photolithographically to produce an oxide pattern 54 on an upper surface. An etch resistant Boron P type diffusion is produced in regions 56 and 58 defining the inner and outer flexure supported elements 16 and 22 as illustrated above in FIG. 1.

In FIGS. 2A and 2B a separate pattern of holes or windows have been defined by photolithography in a layer of oxide 60 thermally grown on the surface of the semiconductor material 52 in order to permit the selective diffusion of flexure portions 62 and 64 of etch resistant P type Boron dopant extending respectively between the regions 56 and 58 on the one hand and the remainder of the material 52 on the other hand. A double layer metallization consisting typically of Titanium-Tungsten/Gold Ti/W/Au is deposited on the wafer. The top layer of gold is patterned photolithographically without attacking the underlayer of Ti/W which is continuous over the wafer at this point.

Subsequently, as shown in FIG. 3, a thick photoresist layer 66 is deposited and apertured at the location of mass 68 to permit the plating up of mass 68, corresponding to the mass 28. The mass 68 may typically be a gold plating on a pad of gold metallization. The Ti/W layer is used for a common electrical contact to the exposed areas which are to be plated. It is later removed except under the plated mass.

A pattern of electrodes illustrated in FIG. 4 is then applied to a glass substrate 70. In particular, outer electrodes 72 correspond to the electrodes 30 and 32 and would typically be excited, via bonding pads, by torque generators 74 and 75 for inducing the torque described below. Inner electrodes 76 and 78 are similarly provided on the glass substrate 70 and may be connected to signal generators 80 and 81 as is shown below. Intermediate electrodes 82 provide a guard function between the torque and signal generation electrodes as described above. The electrodes 76 and 78 typically correspond to the electrodes 38 and 40 illustrated in FIG. 1.

Turning to FIG. 5, etching through the surface of the substrate 52 with a silicon etchant that doesn't attack other elements of the structure produces the upper structure illustrated there in which the inner element 56 is completely freed except for attachment through the diffused flexures 62 which couple it to the outer element 58 which is in turn connected by the thin diffused flexures 64 to the material 52. The diffusion of dopant creating the regions 56, 58, 62 and 64 prevents or reduces the rate of etching so that while the mass of semiconductor material 52 is rapidly etched, only slight etching occurs in the diffusion doped areas. The structure illustrated in FIG. 5 is thereby created. Dopant levels that stop etching are in the range of greater than $8 \times 10^{19}$ Boron ions/cm$^3$.

The glass substrate 70 and the semiconductor frame 52 are then brought into alignment as illustrated in FIG. 5 and affixed in that position by epoxy bonding at peripheral portions or other means as known in the art. Electrodes 72, 82, 76 and 78 terminate in bonding pads located on an outer periphery of glass substrate 70. The completed structure, when mounted in a suitable package and wire bonded to the package leads, provides a miniaturized vibrational gyroscopically sensitive motion transducer readily fabricated using diffusion, etch and plating technologies capable of rapid production of multiple versions. The electrodes 72, 82, 76 and 78 preferably extend to be proximate to the elements 56 and 58 for reasons of sensitivity.

The unbalanced mass configuration of FIG. 5 may be sensitive to acceleration along certain axes. Where such sensitivity is not desired, a structure and the processing steps therefore, as illustrated in FIG. 5A, may be utilized to achieve a balanced mass. As shown there the material 52 is etched to produce a depression 53. The surface of the etched material 52 is then doped in a layer 55 to produce etch resistance as noted above. Over the entire doped surface of the material 52 a metallization layer 57, typically of titanium tungsten and then gold, is applied including the depression 53. A photoresist layer 59 is applied over the metalized layer 57 and exposed in a region 61 which is to be plated with a balanced mass. A mass 68A, typically of electroplated gold, is then plated up into the aperture in the photoresist 59. Alternatively, unessential portions of layer 57 are etched off prior to the application of the photoresist layer 59 except in the areas to be plated to avoid etching mass 68A with later removal of layer 57.

Thereafter the photoresist layer 59 is removed and the portion of the material 52 underlying the doped region 55 is etched away leaving a balanced mass 68A supported from the doped layer 55 which, in conjunction with the formation of flexure supports as illustrated above, becomes a flexure supported element with a balanced mass thereon. The masses 68 or 68A may be formed of other materials such as deposited or grown silicon or polysilicon.

In lieu of forming the electrodes on a separate glass substrate such as the substrate 70 illustrated in FIG. 5, the electrodes may be formed within a layer of the semiconductor material. Such a device and the process for its formation is more fully illustrated with respect to FIGS. 6A through 8A.

Figure 6:
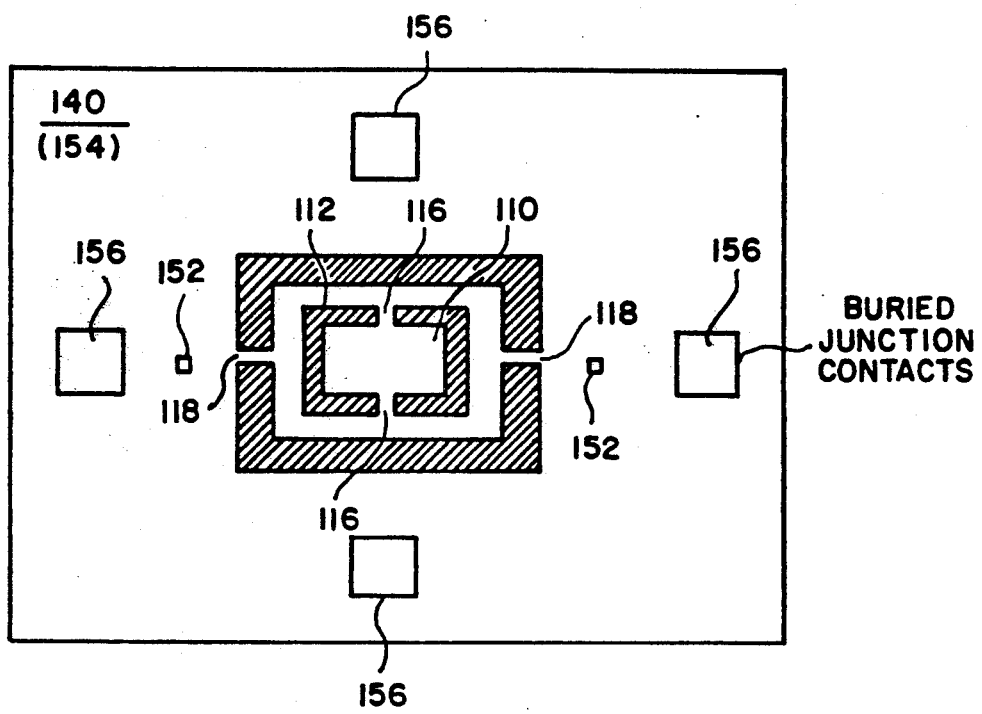
FIGS. 6A and 6B are first top views in the production of a semiconductor chip transducer from a single semiconductor mass according to a second embodiment.
Figure 6A:
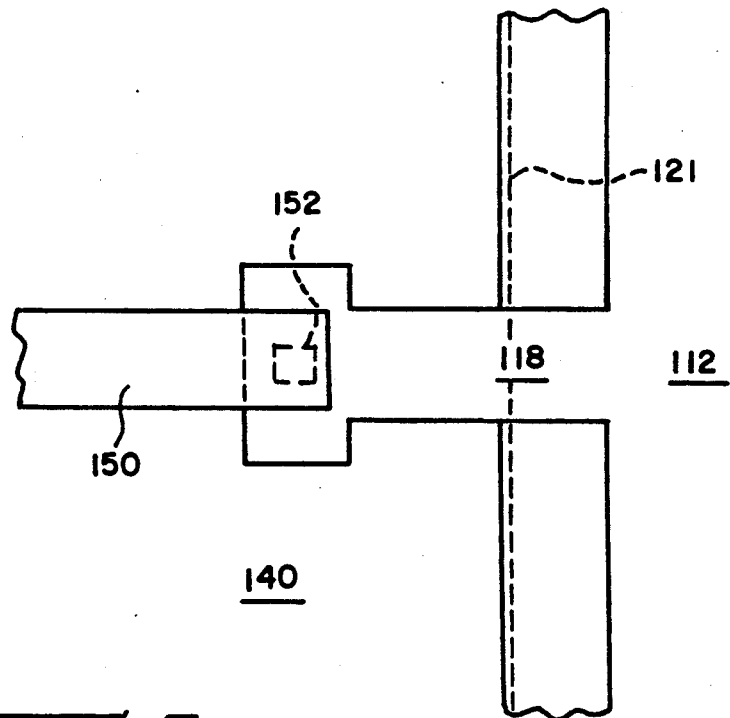

As illustrated in FIG. 6A there is to be produced a pattern of buried junctions within the semiconductor material. These buried junctions include torque electrodes 120 having remote contacts to which connection is made from the surface of the semiconductor material, and signal generator electrodes 124 having remote contacts also connected to the surface of the semiconductor material. After this pattern is produced, a layer of silicon is epitaxially grown over it.

As shown in FIG. 6B a pattern of diffused, etch resistant dopant is applied through the surface of the epitaxially grown semiconductor material to portions to become inner and outer flexure supported elements 110 and 112 which are in turn surrounded by semiconductor material acting as a frame 114. The elements 110 and 112 are joined by flexure defining diffusions 116 while the element 112 and the frame 114 are joined by flexure defining diffusions 118.

Figure 7:
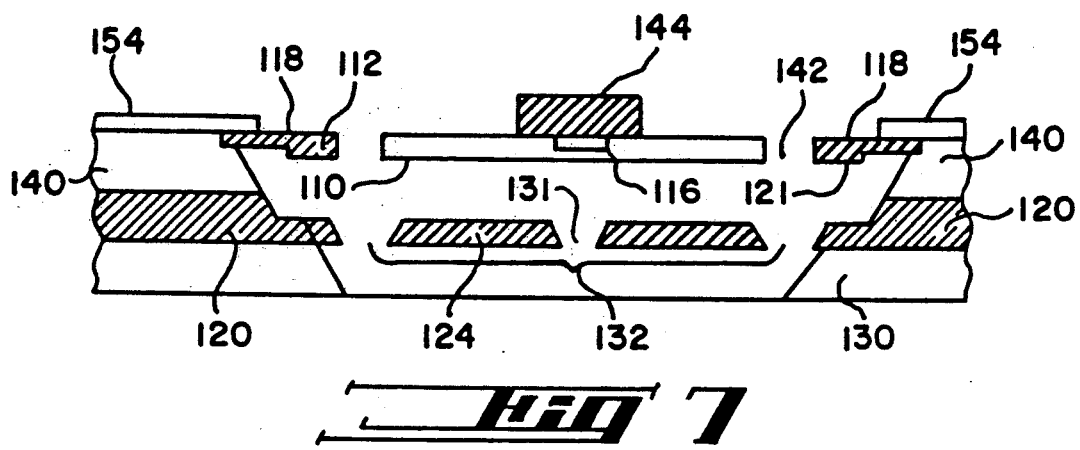
FIG. 7 is a second view in cross-section of a semiconductor device according to the second embodiment during fabrication.
Figure 7A:
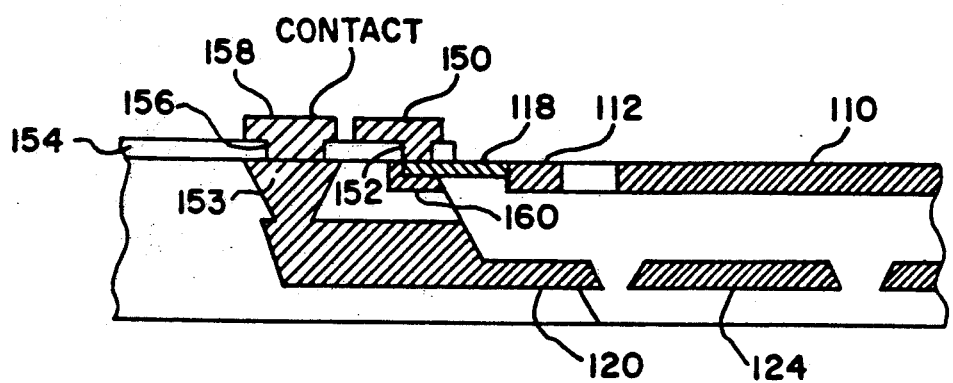
FIG. 7A is yet further view in cross-section of a semiconductor device in fabrication according to a second embodiment.
Figure 7B:
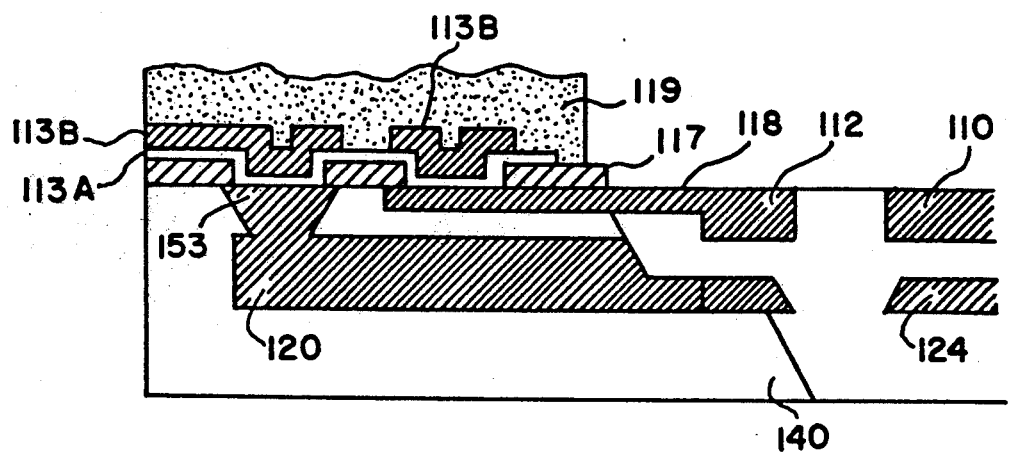
FIG. 7B illustrates an alternative etching stop.

The production of such a structure is achieved from a single mass of semiconductor material 130 typically N type as illustrated in FIGS. 7 through 7B. On the surface of the material 130 shown in FIG. 7 are provided highly doped P type regions corresponding to the pattern of electrodes 120 and 124. Intermediate these regions a shallow N type diffusion may be used to insure electrical isolation of any P dopant that might drift between these regions. Electrodes 124, 120 will be cantilevered in the final etched unit, because any buried electrodes with outside corners will be etched under. They are anchored by being formed long enough to extend past the etch window into the silicon there.

After the creation of the pattern of conductors 120, 124 an N type epitaxial layer 140 is grown completely over the semiconductor material 130 up to a new surface 142. Layer 140 can include an initial N+ layer to offset any P drifting followed by a N layer to facilitate surface processing. Dopant diffusions and etching techniques as described above are then utilized to produce the pattern of the inner and outer flexure supported elements 110 and 112 and connecting flexures 116 and 118 as illustrated in FIG. 6B. A step of etching through an apertured dielectric layer 154 on the surface 142 of the original semiconductor material 130 undercuts elements 110 and 112, stopping at the pattern of conductors 132 where they exist.

As shown in FIG. 7A, a further step provides a P type diffusion through an aperture 156 in the dielectric layer 154 of a highly doped diffusion 153 extending down to respective contact electrodes 120, 124. Advantageously, this diffusion may proceed at the same time the elements 110 and 112 are diffused. A metalized contact 158 is then provided in the aperture 156 completing the electrical connection to the buried electrodes 120, 124.

A mass, such as a gold mass 144, is plated on what will be the inner elements 110 as described above. Electrical contact to the elements 110 and 112 is provided through the flexures 116 and 118, all of which are semiconducting, through a metalized contact 150 provided through an aperture 152 in insulating oxide layer 154.

Alternatively, prior to diffusion formation of the flexures 116 and 118, a diffusion of a highly doped nature is provided in a region 160 surrounding the point where the semiconductor flexures 118 and electrical contact 150 are provided. This highly doped region, typically of a dopant type opposite to the type in the flexures 118, provides additional electrical insulation 131 between the pattern 132 of electrical connections buried within the semiconductor material and the flexure supported inner and outer elements 110 and 112.

FIGS. 8 and 8A illustrate, in surface views, the resulting structure. As shown there, the inner element 110 and outer element 112 are shown supported respectively by resilient flexures 116 and 118 under dielectric layer 121 within the frame 140, typically having a dielectric layer 154 thermally grown or deposited thereon. The contacts 158 are provided at the surface connecting through dielectric layer 154 to the highly doped diffusions 153 to the buried electrodes 120 and 124. Contacts 150 through windows 152 are similarly provided in order to permit electrical connection to the elements 112 and 110. Typically these electrodes and elements will be electrically accessed utilizing the circuit methodology illustrated below. A typical gap between resiliently supported members and the buried electrodes is 8 microns.

FIGS. 9 through 14 illustrate a further process for the formation of buried junction electrodes utilizing a dielectric isolation technique as opposed to the semiconductor PN junction isolation technique illustrated above with respect to FIGS. 6A through 8B.

Figure 9:
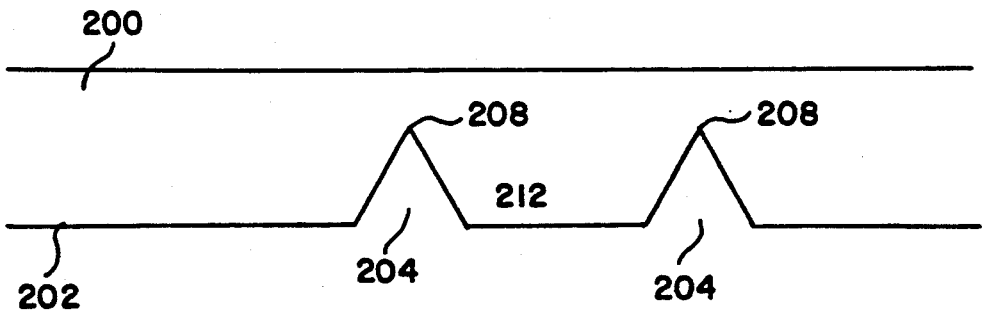
FIG. 9 is a sectional view of a first step in the production of a semiconductor chip transduction device having dielectric isolation of electrodes, according to a third embodiment.

As illustrated in FIG. 9 a mass 200 of semiconductor material of <100> orientation is etched through a first surface 202 in a pattern of anisotropically etched grooves 204 which extend into peaks 208 defining between them regions 212 which are to be dielectrically isolated from other regions of the mass 200 as will be more fully explained below. A pattern of regions 212 is applied in the mass 200 according to the pattern of electrical connections desired. For a gyroscopic motion transducer of the type illustrated above, there will typically be four regions 212 in which the peaks 208 surround the region 212 to permit electrical contact to the region 212 in the manner of the buried contacts 122 and 126 illustrated in FIG. 6A above.

Figure 10:
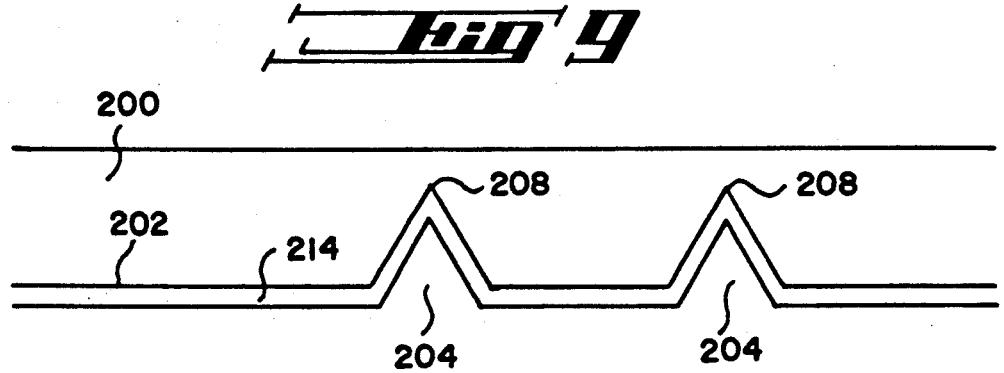
FIG. 10 is a sectional view of a further processing step according to the third embodiment.
Figure 11:
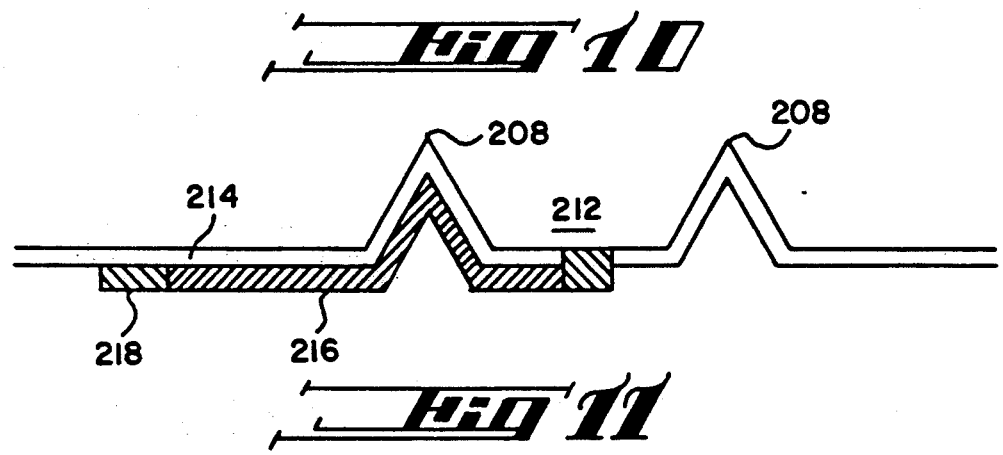
FIG. 11 is a yet further sectional view in the process of semiconductor chip transducer manufacture according to the third embodiment.
Figure 12:
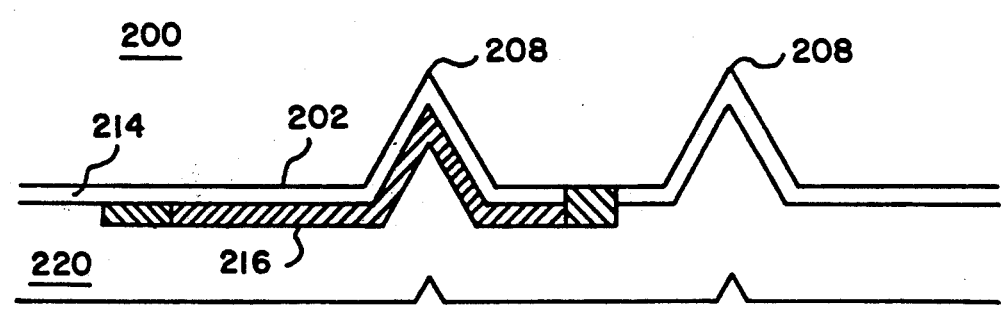
FIG. 12 is a sectional view of a yet further view illustrating second dielectric layer formation according to the third embodiment.

As illustrated in FIG. 10 a subsequent step in processing applies a dielectric layer 214 over the entire surface 202 of the semiconductor mass 200 including grooves 204. Subsequently in a step illustrated in FIG. 11 the dielectric layer 214 is apertured at locations within the region 212 and a conductive pattern 216 applied through the apertures in the regions 212 and along the surface of the dielectric layer 214 to electrodes 218 in locations corresponding to the torque and signal generator electrodes illustrated above for purposes of gyroscopic motion transduction. The conductive pattern 216 is typically doped and photolithographically patterned polysilicon. The polysilicon may be applied as a thin film in a CVD, chemical vapor deposition, reactor. Subsequently, as illustrated in FIG. 12 an insulating layer 220 is applied over the entire surface 202 having the layers 214 and 216 thereon. As shown in FIG. 13, a thick layer of polysilicon 221 is deposited over layer 220, approximately 300 microns thick.

The surface of the mass of semiconductor material 200 opposite from the surface 202 is back lapped and chemically polished to the point where the peaks 208 are just slightly removed, thus isolating the regions 212 by dielectric bowls formed by the insulating dielectric layers 214 and defining a new surface 222 to the semiconductor material 200. On this surface, as shown in FIG. 14, the resiliently supported members of the gyroscopic motion transducer will be formed utilizing doped diffusion and etching techniques described above. In particular, a diffusion 223 followed by a metallization layer 230 through an aperture 228 in an oxide layer 224 provides contact to the regions 212 and thence to the layer 216. Similarly, as illustrated above, an inner flexure supported element 232 is etched out of the parent material 200 along with resilient flexures 234, outer flexure supported element 236 and outer resilient flexures 238, all doped in a manner to substantially impede their etching while the remainder of the parent material 200 is etched. An electrical contact 240 through an aperture 242 in the oxide layer 224 is also provided to contact the semiconductor material forming the gimbal structure of inner element 232, outer element 236 and connecting flexures 234 and 238.

An N type diffusion layer may be formed around contact 242 to provide additional isolation if desired as described above. Typically layer 200 (or 140) is N type and thus the P type diffusion used to form the flexures create a PN isolation junction with layer 200 (140). Similarly, a balanced or unbalanced mass 244 is provided in the center of the substrate 232 to provide the necessary mass for gyroscopic motion transduction. In the completed sectional view of FIG. 14 an additional electrode 246, forming one of the pair of electrodes for signal generation, is also shown formed over the layer 214. A similar set of electrodes will be provided on the other side, not shown, of the view of FIG. 14. All of such electrodes are contacted via oxide isolated doped silicon regions 212 described above. A high level of electrical isolation is accomplished using oxide layer separation of the electrodes 218, 246 etc. as illustrated in FIGS. 9 through 14. The dielectrics utilized may be thermally generated oxides or silicon nitrides to minimize unwanted under etching of the dielectric to silicon interface.

An acceleration sensitive motion transducer may be formed utilizing the technology described above, and as more fully illustrated in FIGS. 15 and 16. In a surface view of FIG. 15, a flexure supported element 250 is supported by flexures 252 within a frame of semiconductor material 254. The element 250 will typically have a mass 256 applied at one end or the other. A pair of driving electrodes 258 and sensing electrodes 260 are provided below and in close proximity to the element 250. The electrodes 258 and 260 may be formed upon a separate glass substrate, or formed in the semiconductor frame 254 either by the buried junction with doped layer isolation or oxide layer isolation techniques illustrated above. In a cross-sectional view illustrated in FIG. 16 the form of the electrodes is that of the PN junction isolated buried electrodes formed in accordance with the techniques of FIG. 6A-14 described above. Thus as shown there a metal contact 262 is provided through an oxide layer 264 to a doped region 266 which extends down to contact each of the respective electrodes 258 and 260 as described above.

FIG. 17 illustrates a modification to the element 250 to take advantage of preferred etching capabilities through the semiconductor material. Such a modification may be applicable to any of the motion transducers described above but for ease of understanding it is represented with respect to an acceleration transducer in FIG. 17. The nature of gyroscopic transducers normally avoids the need for such modification. As shown there the preferred orientation for the semiconductor crystalline material, whether in an original mass or an epitaxially grown layer, is to have the <100> plane represent the surface of the view of FIG. 17. In that case, etching through the aperture between the body or mass of semiconductor material 254 and the region of element 250 will produce a natural high level of etch stop at the <111> planes of the semiconductor material which occur in four angled planes, producing the nicely shown shape of side walls 270 illustrated in FIG. 16. In order to promote undercutting completely of the supported element 250, additional apertures, such as aperture 272 in FIG. 17 are provided within element 250, during fabrication, by photomasking that region during the diffusion techniques so that etching applied through the surface will cut directly through element 250 and form the aperture 272. This promotes undercutting and complete isolation of the substrate element 250 since the etching will stop at a <111> plane but can be kept etching by an exposed under-surface of the <100> plane. Thus etching will stop at the outer corners so that it is only necessary to place aperture(s) 272 to insure that the outer corners occur only where wanted, that is corners 273. In the case of the gyroscope the presence of flexures at orthogonal orientations insures proper undercut without additional apertures.

In this manner it is possible to provide a waffled under-etching of the flexure supported element in a motion transducer in order to limit the supported weight except in the desired mass area. Such a waffle etching is illustrated in FIGS. 18A and 18B for a gyroscope application, an accelerometer application being also intended. As is shown there, a resiliently supported inner element 280 has been doped in a first region 282 to a greater depth than first and second portions 284 in order to promote under-etching in the regions 284 and reduce weight of the element 280 to provide enhanced gyroscopic transducer sensitivity. The element 280 has a motion sensing mass 288 and is resiliently supported by flexures 290 within an outer flexure supported element 292 which is in turn supported from the frame or mass of semiconductor material 286 by further thin resilient flexures 294. The outer supported element may also be waffled to permit control of the resonant frequencies of both inner and outer elements for enhanced gyroscopic performance electrodes, buried within the mass 286, or otherwise as has been described above, are provided for torque and signal generation capabilities.

A further level of etch control an be achieved by use of an electrochemical etch stop. For this purpose, a structure such as that illustrated in the process of FIGS. 6A-8B, is produced with all P types replaced by N dopants and N types replaced by P dopants. Thus deep and shallow N type diffusions are made in P type silicon to define flexure supported elements and flexures. As shown in FIG. 7B, prior to etching to free these elements and flexures, the surface of the semiconductor material is thermally oxidized and coated with a dielectric layer 117 of silicon nitride and patterned. This will be the final, permanent dielectric surface. A metal layer 113A, of $T_i$—W is then applied over layer 117. Gold layer 113B is patterned where it is desired to have a permanent metal pattern such as to make external connections or to plate the mass 144 as described above. The metal layer 113A is removed in the area to be undercut, that is the apertures between the frame and supported elements. A dielectric over glass or other nonconducting layer 119 is deposited over the wafer and patterned to cover all exposed metal to allow a greater voltage for the etch stop process. Etching is accomplished in a solution of ethylene diamine pyrochatechol or potassium hydroxide with the N type diffusion regions interconnected over the entire wafer by the metal layer 113A and connected to a positive (1 to 100 volt) source relative to the etching solution. This causes an etch stop oxide layer around the N type electrodes, releasing them from the constraint of very high dopant levels to produce etch stopping. A high purity anodization layer is applied in a separate bath to passify the etch exposed PN junction. After etching the layer 119 is removed and the $T_iW$ metal layer 113A is removed using gold layer 113B as a resist.

FIGS. 19A and 19B illustrate a further embodiment of the present invention in which the semiconductor material of the elements resilient flexure is dielectrically isolated from the remainder of the semiconductor material. In particular, and as illustrated in a surface view of FIG. 19A and perspective view of FIG. 19B, a flexure supported accelerometer element 300 is supported within a frame 302 of semiconductor material by resilient flexures 304. The resilient flexures 304 are themselves formed by dopant diffused into the semiconductor material of the substrate 300. Regions 307 and 309 are also doped to prevent etching. After such diffusion, a dielectric layer 306 (typically $Si_3N_4$ or $Si_3N_4+SiO_2$) is applied over the entire surface before etching. The layer 306 is apertured to cause dopant diffusion in a pattern insuring etched isolation of the support member 304 from the surrounding semiconductor material of the frame 302. Physical attachment is provided by the unetched dielectric layer 306. To provide electrical connection through this semiconductor member 304 an electrical contact 310 is provided over the insulating layer 306 and through an aperture 311 in the dielectric layer. Etching through apertures 303 and 312 produces an etch profile 305 that undercuts doped regions 309 and 307. Regions 307 enhance the flexure support provided by the dielectric. The apertures 312 allow undercutting to isolate the flexures 304 from the silicon frame. The end of the flexure at a region 313 may be made thicker for additional rigidity and ease of making electrical contact.

Alternatively, a resilient dielectric physical connection between the element 300 and the frame 302 may be provided by growing a dielectric flexure, and subsequently providing electrical metallization thereover in order to complete the electrical connection from the flexure supported element 300 to an external contact on the frame 302.

Figure 20A:
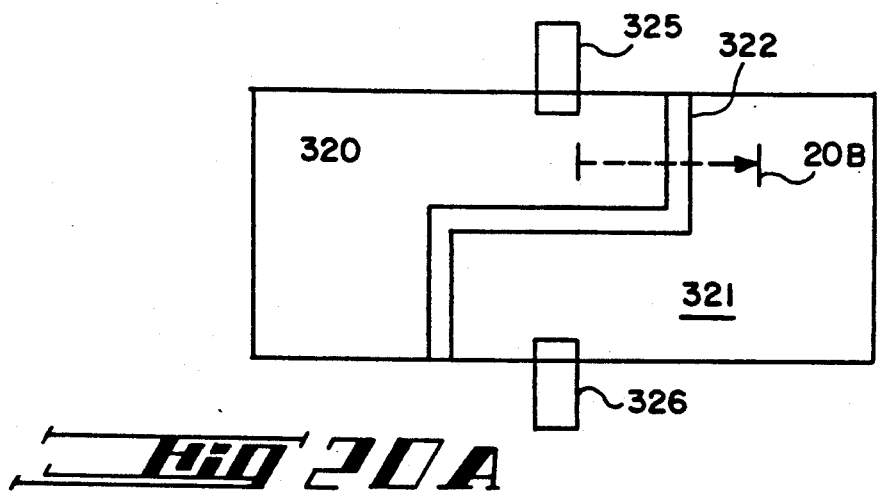
FIGS. 20A and 20B are respective top and sectional views of a flexure supported element having dielectrically isolated first and second portions.
Figure 20B:
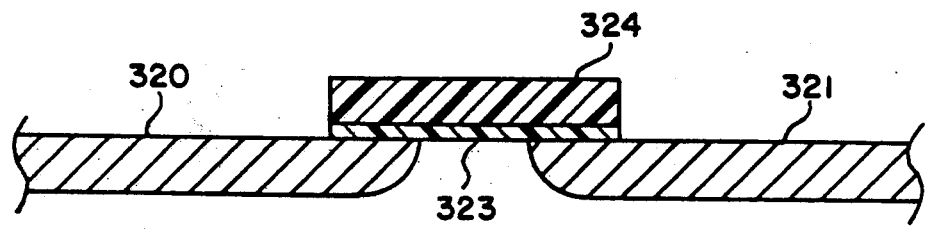

With respect to FIGS. 20A and 20B there is shown a modification of the flexure supported element permitting electrical isolation between first and second opposing flexures. As shown in FIG. 20A a flexure supported element comprises first and second portions 320 and 321 of semiconductor material which are separated by a bridge 322 of dielectric material. In particular, and is more fully shown in FIG. 20B, the dielectric bridge 322 comprises a deposited insulating layer of, for example, silicon nitride ($Si_3 N_4$) layer 323 under a silicon oxide layer 324. The layer may be a composition of the nitride 323 under the oxide 324. Typically the layers 323 and 324 are respectively 0.2 and 1.0 microns in thickness or greater.

The bridge 322 provides physical attachment between the portions 320 and 321 of the flexure supported element but maintains electrical isolation between them. In this manner separate electrically applied signals through respective flexures 325 and 326 can be utilized on the flexure supported element without fear of interference.

Figure 21A:
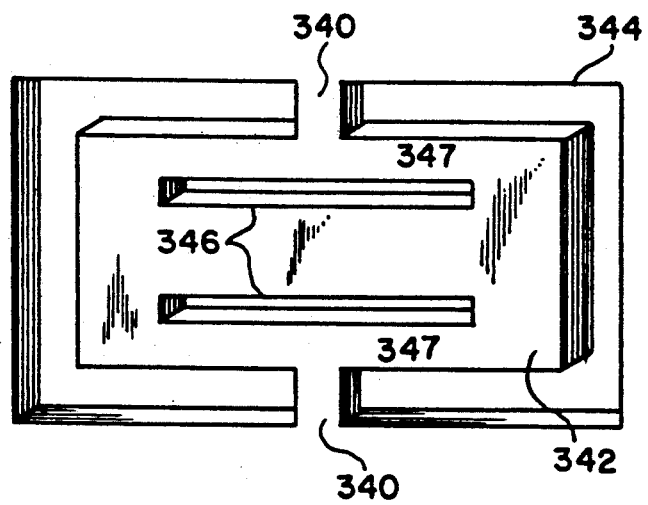
FIG. 21A is a perspective view of a resiliently supported semiconductor substrate having stress relief.

FIG. 21A illustrates an embodiment in which doped flexures 340 resiliently connect an inner supported element 342 and an outer supported element 344. Slits 346 are provided in the inner element 342, although optionally could by provided in the outer element 344, in a region adjacent to the resilient flexures 340 and extending in a direction substantially orthogonal to the directional pull exerted by the flexures 340 between the element 342 and 344. Such a slit creates beams 347 which provide stress relief in the pull exerted between the elements 344 and 342.

Tension between elements 344 and 342 is caused by the high concentration boron diffusion shrinking the lattice spacing in proportion to the boron concentration. Mechanically freed element 342 tries to shrink with respect to the element 344 which restrains it causing a large tensile force on flexures 340. Such forces can be substantial and may indeed run the risk of causing fracture of the resilient support flexure 340 whether formed of a separate dielectric member or integral doped semiconductor material. In addition, this large tensile stress, if not relieved, increases the stiffness of flexures 340 which may be undesirable.

With respect to FIG. 21 there is shown a first step in the modification of the present invention for alternative stress relief in flexures for resiliently supporting the transduction element. As shown there, a groove 400 is etched in a silicon material 402 in the region where a flexure is to be created by dopant induced etch resistance. In FIG. 22 deep and shallow Boron diffusions 404 and 406, for example, have been produced defining the flexure supported element(s) and the flexures. After etching the underlying silicon material 402, the diffusion 406 becomes the flexure itself. The accordion fold provides stress relief without the loss of the twist resilience that is important to the flexures operation for flexible support of a vibrating element.

A further method of producing a stress relieving flexure made of silicon nitride or other deposited material or thermally grown oxide is presented with respect to FIGS. 21 and 22. A deposited or grown layer 401 such as silicon nitride may be applied directly using the groove as a means of replicating the folded joint shape. Layer 401 may be a thin thermal oxide grown layer. It will also take the folded shape of the groove. In this case it is possible to form layer 401 as a composite having the thermal oxide coated with a layer of deposited silicon nitride to help preserve its thickness and integrity through the remainder of the process.

A thermal silicon dioxide resiliently supported element will have the opposite expansion characteristics of boron doped silicon, that is when mechanically etched free it will try to expand and will place flexures under compression. This characteristic is used advantageously by combining silicon elements with oxide joints and vice versa to produce a stress free micromechanical structure. Using the folded flexure increases the type of substrate and flexures that can be combined including dielectric, dielectric and silicon, silicon, or mixtures of these and other types with dielectric components, electrical contacts can be run over them as at 405.

The grooving of the silicon material is also used in the representations of FIGS. 24 and 25 to produce a stop that limits the sticking between the flexure supported element and silicon substrate. In FIG. 24, a mass of semiconductor silicon material 410 is etched in a pit 412 typically six microns square and three microns deep. When etch resistant doping 414 is diffused into the material 410, the diffusion follows the shape of the pit 412. After etch removal of the underlying silicon, a stop of small contact tip 416 is left. A localized stop 416 prevents the edge of the element defined by diffusion 414 from sticking to the etched bottom 411. The stop of FIG. 25 is typically applied at the ends of each flexure supported element remote from the axis of vibration or rotation to prevent the sticking incident to smooth surfaces of such scale touching.

An alternative stop which limits motion is shown in FIGS. 26A and 26B where plated metal buttons 420 are provided at the ends of protruding cantilevered tabs 418. Plated buttons 420 protrude at the edges of semiconductor materials facing supported element 422 at each extremity. Thus each end of the element 422 is limited in the amount of upward travel and therefore also in downward motion. This stop prevents the element 422 from traveling for enough to touch the bottom of the etched portion of the silicon material where it might stick and interfere with proper instrument motion.

Drive electronics for the signal and torque electrodes of a gyroscopic transducer or an accelerometer are illustrated in FIGS. 27 and 28.

With respect to FIG. 27 there is shown an apparatus for deriving a position signal from the signal generator electrodes and the capacitance formed thereby. In particular, a high frequency, typically 100 Khz, excitation signal is applied to the electrodes of the signal generator capacitors, represented as capacitors 450 and 452, through first and second operational amplifiers 454 and 456 respectively and inverting amplifier 458 in the case of capacitor 450 in order to provide phase opposition signals across the two capacitors 450 and 452. The other end of the capacitors 450 and 452, typically the flexure supported element 459, is applied through a buffer amplifier 460, a gain determining operational amplifier 462 to a first synchronous demodulator 464 driven at the 100 Khz excitation frequency.

A second excitation signal, typically at 1600 Hz for inducing vibratory motion of the gyropscope flexure supported elements, is applied to inverting and noninverting inputs respectively of differential amplifiers 468 and 470. A bias signal for offset control is applied to the other noninverting and inverting inputs of those amplifiers. The signals from the amplifiers 468 and 470 are applied to the electrodes of torque or vibration generating capacitors 476 and 478.

After the demodulator 464 recovers the envelope from the 100 Khz signal, 100 KHz switching spike are removed in a filter 480. A second demodulator 482 responds to the output of the filter 480 and synchronously demodulates at 1600 Hz. The output of the demodulator 482 is filtered in a filter 484 to remove any demodulation spikes leaving a signal representative of actual position. In gyroscopic transduction that signal represents the turning rate of the excited gyro.

With respect to FIG. 28 the operational electronics for use with an acceleration transducer are illustrated. In this case only a single frequency of excitation is required and is applied through a set of amplifiers 520, 522 and 524, of the type generally shown above with respect to FIG. 27 but illustrated in a more general form in FIG. 28. The outputs of the amplifiers 522 and 524 are applied to the electrodes facing the flexure supported element 526. The signal at the flexure supported element 526 is applied through a buffer amplifier 528 to a demodulator 530 and filter 532 which recover the envelope at the 100 Khz excitation. An integral plus proportional controller 534 processes the signal for appropriate phased application through the inverting and noninverting inputs of amplifiers 536 and 538 and thence to the torquing electrodes of the accelerometer, used to drive the flexure supported element back to a neutral position in the presence of acceleration. The value of this rebalance signal from an integral plus proportional controller 534 provides the output indicative of net acceleration along the axis of sensitivity of the particular accelerometer.

The present invention which provides a vibrationally excited resiliently supported member also functions as a pressure transducer since the vibrational motion is sensitive to the pressure of surrounding environmental gases. Accordingly, the same structure utilized for gyroscopic or acceleration sensitivity may similarly be used to sense pressure as a function of the vibrational resistance encountered by more or less gas in the device environment.

Semiconductor motion transducers according to the above description are typically mass produced a number at a time on a silicon wafer and are then subsequently cut from the wafer to provide individual sensors which may then be packaged in various semiconductor microcircuit type packages with wire bonding from external contacts to the various surface conductor regions illustrated above. The complete package may be either hermetically sealed, or if for use as pressure transducer, left exposed to the atmosphere.

In an alternative embodiment illustrated in FIG. 29, gyroscopic sensitivity is increased by increasing the moment of inertia for the flexure supported element by extending it away from the support plane as far as possible. To that end, in a mass of silicon 550, in which buried electrodes 552 may have been placed, a deep, for example 20 to 200 micron, pit 554 is formed through an aperture 556 in a silicon nitride layer 558. The pit 554 is typically formed by reactive ion etching or anisotropic etching. If anisotropic etching is used the pit will have sloped sidewalls. A semiconductor P type dopant layer 560 is diffused into the pit 554 and the pit is then filled with an epitaxially grown mono- or poly silicon mass 562 up to a level just above the level of the mass 550. The surface may be lapped smooth using the layer 558 as a lap stop and a marker to facilitate further photolithographic processing.

In FIG. 30, layer 558 is apertured to permit a diffusion 564 of P type Boron dopant in the region where the flexure supported element is to be produced. This leaves a nearly planar surface which can be processed by photo lithography as before. Thereafter, a mass 566 can be plated on the silicon. The mass 566 maintains the center of gravity on the axis of rotation while the center of inertia is well removed.

In a further embodiment of the invention illustrated in FIG. 31, an FET transistor is diffused into the silicon adjacent to the point where the flexures terminate. This allows the signal from the flexure supported element to be buffer amplified with a minimum of lead length thereby minimizing the effect of shunt capacitance reducing the signal level. To accomplish this benefit, there is diffused into a silicon layer 570 of N type a pair of P type regions 572 and 574 to act as FET source and drain elements respectively. These diffusions are performed advantageously at the same time as the flexure 588. These will be a biased in conventional manner to provide the operation of a FET. For this purpose, the P diffusions are contacted by metallization runs 576 and 578. The gate for the FET is formed by a metallization 580 over a thin regrown dielectric portion 582 of a dielectric layer 584. The metallization extends to a contact window 586 in the dielectric covering the flexure 588 used to support and contact the flexure supported element 590.

Other applications and modifications of the structure and processes illustrated above may be practiced within the scope of the invention. It is accordingly intended to define the invention only in accordance with the following claims.

I claim:

1. A semiconductor chip motion transducer assembly comprising:
   a semiconductor transducer element resiliently supported and surrounded by a semiconductor frame;
   said semiconductor frame and transducer element being substantially co-planar at a surface plane thereof, said surface plane being the <100> crystalline plane surface of the semiconductor material forming said frame and transducer element;
   first and second flexures joining said transducer element to said frame to permit relative motion therebetween about an axis passing through said flexures;
   said frame and transducer element being monocrystalline, with said frame comprising an etched portion surrounding said transducer element with peripheral walls of said etched portions substantially parallel to plural <111> orientation planes of the semiconductor material forming said frame and transducer element, wherein at least one of said frame and said transducer element defining at least one slot substantially adjacent the location at which at least one of said first flexure and said second flexure joins said transducer element to said frame, said at least one slot providing stress relief;
   means for inducing relative motion of said transducer element with respect to said frame; and
   means for sensing relative motion of said transducer element with respect to said frame, wherein
   said means for inducing and said means for sensing each comprises at least one electrode disposed below said surface plane and extending under at least a portion of said transducer element, for providing application of forces to and detection of motion of said transducer element relative to said frame.

2. The assembly of claim 1 wherein said transducer element includes apertures provided to facilitate the etching of said frame under said transducer element, and to prevent etching being stopped under said transducer element at the <111> crystal orientation planes.

3. The assembly of claim 1 further including:
   a mass supported by said transducer element, and responsive to said means for inducing, to enable relative motion of said transducer element and supported mass with respect to said frame, and wherein said relative motion enables gyroscopic sensitivity by said means for sensing.

4. The assembly of claim 1 further including:
   a mass supported by said transducer element, and responsive to said means for inducing, to enable relative motion of said transducer element and supported mass with respect to said frame, and wherein said relative motion enables acceleration sensitivity by said means for sensing.

5. The assembly of claim 1, wherein:
   said transducer element includes first and second transducer elements and third and fourth flexures flexibly joining said first and second transducer elements along an axis substantially orthogonal to said axis running through the first and second flexures joining said first transducer element and said frame.

6. The assembly of claim 1 further including a first and second mass applied to first and second opposite surfaces respectively of said transducer element along said axis passing through the first and second flexures joining said transducer element and said frame.

* * * * *

UNITED STATES PATENT AND TRADEMARK OFFICE
CERTIFICATE OF CORRECTION

PATENT NO. : 5,195,371
DATED : March 23, 1993
INVENTOR(S) : Paul Greiff

It is certified that error appears in the above-indentified patent and that said Letters Patent is hereby corrected as shown below:

Column 3, line 12, "cf" should read --of--.

Column 9, line 38, "performance electrodes" should read --performance. Electrodes--.

Column 14, line 50, "element at" should read --element except at--.

Signed and Sealed this

Thirty-first Day of May, 1994

Attest:

BRUCE LEHMAN

Attesting Officer

Commissioner of Patents and Trademarks